United States Patent
Cheng et al.

(10) Patent No.: US 9,119,113 B2
(45) Date of Patent: Aug. 25, 2015

(54) HANDOVER METHOD, HANDOVER SYSTEM, AND APPARATUS FOR A UE ATTACHING TO A LOCAL IP NETWORK

(75) Inventors: Hong Cheng, Singapore (SG); Tien Ming Benjamin Koh, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 190 days.

(21) Appl. No.: 13/639,817

(22) PCT Filed: Apr. 6, 2011

(86) PCT No.: PCT/JP2011/002046
§ 371 (c)(1),
(2), (4) Date: Oct. 5, 2012

(87) PCT Pub. No.: WO2011/129070
PCT Pub. Date: Oct. 20, 2011

(65) Prior Publication Data
US 2013/0028237 A1 Jan. 31, 2013

(30) Foreign Application Priority Data
Apr. 16, 2010 (JP) .................. 2010-094775

(51) Int. Cl.
*H04W 4/00* (2009.01)
*H04W 36/00* (2009.01)
(Continued)

(52) U.S. Cl.
CPC ...... *H04W 36/0016* (2013.01); *H04W 36/0033* (2013.01); *H04W 36/0038* (2013.01); *H04W 80/04* (2013.01); *H04W 92/20* (2013.01)

(58) Field of Classification Search
CPC .............. H04W 36/00; H04W 36/005; H04W 36/0011; H04W 36/0016; H04W 36/0033; H04W 36/0038
USPC .................................. 370/331, 332
See application file for complete search history.

(56) References Cited

U.S. PATENT DOCUMENTS 8,600,370 B2 * 12/2013 Choudhury et al. ....... 455/422.1
2010/0272013 A1 * 10/2010 Horn et al. .................... 370/328
(Continued)

FOREIGN PATENT DOCUMENTS

| EP | 2166797 A1 | 3/2010 | |
|---|---|---|---|
| WO | 2009/089749 A1 | 7/2009 | |
| WO | WO 2009106791 A1 * | 9/2009 | ............ H04W 88/14 |

OTHER PUBLICATIONS

Service requirements for Home NodeBs and Home eNodeBs, 3GPP TS 22.220 V10.0.0 Release 10, Sep. 2009, http://www.3gpp.org/ftp/Specs/archive/22_series/22.220/22220-a00.zip.
(Continued)

*Primary Examiner* — Farah Faroul
(74) *Attorney, Agent, or Firm* — Pearne & Gordon LLP

(57) ABSTRACT

With the deployment of home NodeB or home eNodeB, a user can access both operator's core network and Local Internet (IP) Access (LIPA), e.g. to home based network or general Internet, on the same device at the same time. However, existing mechanisms do not allow an efficient way of LIPA mobility support, especially when there are multiple home NodeBs or home eNodeBs serving the same LIPA domain. The present invention provides a solution that can achieve seamless mobility among different home NodeBs or home eNodeBs without interruption to LIPA service. The LIPA traffic for the terminal can be contained within the local domain during the handover process. It also provides support of the relocation of the gateway that provides the LIPA access to the mobile terminal.

18 Claims, 9 Drawing Sheets

(51) Int. Cl.
*H04W 80/04* (2009.01)
*H04W 92/20* (2009.01)

(56) References Cited

U.S. PATENT DOCUMENTS

| | | | | |
|---|---|---|---|---|
| 2011/0103310 | A1* | 5/2011 | Stojanovski et al. | 370/328 |
| 2011/0158171 | A1* | 6/2011 | Centonza et al. | 370/328 |
| 2011/0212723 | A1* | 9/2011 | Kunz et al. | 455/435.1 |
| 2011/0223919 | A1* | 9/2011 | Vikberg et al. | 455/436 |
| 2011/0225319 | A1* | 9/2011 | Aso et al. | 709/238 |
| 2011/0286429 | A1* | 11/2011 | Vikberg et al. | 370/331 |
| 2012/0039213 | A1* | 2/2012 | Cheng et al. | 370/254 |
| 2012/0135701 | A1* | 5/2012 | Zhu et al. | 455/404.1 |
| 2012/0324100 | A1* | 12/2012 | Tomici et al. | 709/224 |
| 2013/0003697 | A1* | 1/2013 | Adjakple et al. | 370/331 |
| 2013/0089076 | A1* | 4/2013 | Olvera-Hernandez et al. | 370/332 |
| 2013/0208661 | A1* | 8/2013 | Nylander et al. | 370/328 |
| 2013/0230024 | A1* | 9/2013 | Lim et al. | 370/331 |
| 2013/0301610 | A1* | 11/2013 | Ali et al. | 370/331 |
| 2013/0308527 | A1* | 11/2013 | Chin et al. | 370/328 |
| 2014/0003273 | A1* | 1/2014 | Dimou et al. | 370/252 |
| 2014/0113637 | A1* | 4/2014 | Guan et al. | 455/437 |
| 2014/0126539 | A1* | 5/2014 | Adachi | 370/331 |
| 2015/0024746 | A1* | 1/2015 | Adachi | 455/435.1 |

OTHER PUBLICATIONS

General Packet Radio Service (GPRS) enhancements for Evolved Universal Terrestrial Radio Access Network (E-UTRAN) access, 3GPP TS 23.401 V9.3.0 Release 9, Dec. 2009, http://www.3gpp.org/ftp/Specs/archive/23_series/23.401123401-930.zip.

Security of Home Node B (HNB) / Home evolved Node B (HeNB) (Release 9), 3GPP TS 33.320 V9.0.0 Release 9, Dec. 2009, http://www.3gpp.org/ftp/Specs/archive/33_series/33.320/33320-900.zip.

Local IP Access and Selected IP Traffic Offload, 3GPP TR 23.829 V0.5.1 Release 10, Feb. 2010, http://www.3gpp.org/ftp/Specs/archive/23_series/23.829/23829-051.zip.

X2 application Protocol, 3GPP TS 36.423 V9.1.0 Release 9, Dec. 2009, http://www.3gpp.org/ftp/Specs/archive/36_series/36.423/36423-910.zip.

E-UTRA and E-UTRAN Overall description; Stage 2, TS 36.300 V9.2.0 Release 9, Dec. 2009, http://www.3gpp.org/ftp/Specs/archive/36_series/36.300/36300-920.zip.

E-UTRAN S1 Application Protocol (S1AP), 3GPP TS 36.413 V8.6.1 Release 8, 2009-06, http://www.3gpp.org/ftp/Specs/archive/36_series/36.413/36413-861.zip.

International Search Report for PCT/JP2011/002046 dated Jul. 22, 2011.

* cited by examiner

HANDOVER METHOD, HANDOVER SYSTEM, AND APPARATUS FOR A UE ATTACHING TO A LOCAL IP NETWORK

TECHNICAL FIELD

This invention relates to data communications network. More specifically, it relates to the management for the local IP access in a mobile communication system.

BACKGROUND ART

With the introduction of consumer premises based access node, e.g. Home Node B (HNB), Home eNode B (HeNB), Femto Cell base station, Atto Cell base station or home base station, 3GPP also created use cases for the Local IP Access (LIPA) and Selected IP Traffic Offloading (SIPTO) (Non Patent Literature 1), where the Packet Data Network (PDN) Gateway PGW) is collocated or close to the HNB/HeNB. With LIPA or SIPTO, a User Equipment (UE) accessing the network via cell/cells of a HNB/HeNB can obtain access to network that is connected or near to the HNB/HeNB besides the operator's core network. For example, LIPA allows direct access to the home based network or general Internet without going through the operator's core network.

In certain cases, there may be multiple HNB/HeNBs deployed around the same area, e.g. in an enterprise/campus network deployment. These HNB/HeNBs are connected to the same local network. In such cases, mobility between the HNB/HeNBs is to be supported, such that service will not be interrupted when user moves around. For example, when a UE moves between cells of the HNB/HeNBs belonging to the same enterprise network, it should be able to continuously downloading files and accessing emails. This can be achievable using the existing mobility procedures defined in (Non Patent Literature 2).

CITATION LIST

Non Patent Literature

[NPL 1] Service requirements for Home NodeBs and Home eNodeBs, 3GPP TS 22.220 V10.0.0 Release 10, 2009 September, http://www.3gpp.org/ftp/Specs/archive/22_series/22.220/22220-a00.zip

[NPL 2] General Packet Radio Service (GPRS) enhancements for Evolved Universal Terrestrial Radio Access Network (E-UTRAN) access, 3GPP TS 23.401 V9.3.0 Release 9, 2009 December, http://www.3gpp.org/ftp/Specs/archive/23_series/23.401/23401-930.zip

[3] Security of Home Node B (HNB)/Home evolved Node B (HeNB) (Release 9), 33.320 V9.0.0 Release 9, 2009 December, http://www.3gpp.org/ftp/Specs/archive/33_series/33.320/33320-900.zip

[NPL 4] Local IP Access and Selected IP Traffic Offload, 3GPP TR 23.829 V0.5.1 Release 10, 2010 February, http://www.3gpp.org/ftp/Specs/archive/23_series/23.829/23829-051.zip

[NPL 5] X2 application Protocol, 3GPP Ts 36.423 V9.1.0 Release 9, 2009 December, http://www.3gpp.org/ftp/Specs/archive/36_series/36.423/36423-910.zip

[NPL 6] E-UTRA and E-UTRAN Overall description; Stage 2, TS 36.300 V9.2.0 Release 9, 2009 December, http://www.3gpp.org/ftp/Specs/archive/36_series/36.300/36300-920.zip

[NPL 7] E-UTRAN S1 Application Protocol (S1AP), 3GPP TS 36.413 V8.6.1 Release 8, 2009 June, http://www.3gpp.org/ftp/Specs/archive/36_series/36.413/36413-861.zip

SUMMARY OF INVENTION

Technical Problem

However, due to the special architecture of the HNB/HeNB deployment, mobile operators may require a Security Gateway (SeGW) for HNB/HeNB to access the core network as in (Non Patent Literature 3). In this case, the HNB/HeNB will be using the IP address allocated by SeGW for communication with core network entities, e.g. Mobility Management Entity (MME) and Serving Gateway (SGW). Traffic from the HNB/HeNB needs to be tunneled to the SeGW. In this sense, the location relationships between the nodes cannot be reflected.

Therefore, during the mobility procedures, the data forwarding between the source HNB/HeNB and target HNB/HeNB will need to go through the core network, as described in (Non Patent Literature 4). This results in inefficiency because it will take time to traverse the core network, and may actually cause service interruptions. Even with X2 interface implemented, the traffic may still have to flow via SeGW, which is in the operator's network. Furthermore, before the handover procedure is completed, the uplink traffic from UE will be forwarded by the target HNB/HeNB to the SGW, because the source HNB/HeNB informs only the SGW address as per (Non Patent Literature 2).

One possible remedy to this is for the source HNB/HeNB to inform the target HNB/HeNB of the LIPA or SIPTO gateway's local address. However, since the X2 signaling does not involve LIPA or SIPTO gateway, the LIPA SIPTO gateway will not be informed to receive UE's traffic from the target HNB/HeNB.

Another possible approach is for the HNB/HeNBs and the LIPA or SIPTO gateways to locally discover each other, such that direct connection can be established. But, the local discovery normally cannot go across different subnet, unless special arrangements are made. Also, it may be a security threat to the mobile operator since they are located outside of operator's controlled domain. Based on above, it is obvious that a better solution to the problem is necessary.

It is an object of the invention to solve the above discussed problems. In particular, it aims to provide a method to allow UE's LIPA and/or SIPTO traffic during handover to be optimized without going via operator's core network.

Particularly, this invention provides a system that allows seamless handover support of LIPA or SIPTO connections without sending the LIPA or SIPTO traffic via operator's core network.

In another aspect, this invention also allows the HeNB to separately treat connections for the operator service access and those for LIPA or SIPTO access.

Solution to Problem

To achieve the above-described object, the present invention provides handover method, handover system, and apparatus for a UE attaching to a local IP network.

Advantageous Effects of Invention

The invention has the advantage of reaching LGW (LIPA-GW) without going via operator's core network before establishment of shortcut path between the target HeNB (HeNB-2) and LGW.

DESCRIPTION OF EMBODIMENTS

In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details.

In the following description, for the purpose of explanation, the 3GPP Long Term Evolution (LTE) and Evolved Packet System (EPS) are used as example access technology and network architecture. However, it will be apparent to anyone skilled in the art that the present invention may be practiced with other access technology and network architecture under the same principle, e.g. GSM, GPRS, UMTS, WiMAX, LTE Advanced, etc.

In the description, LIPA is used as the example. However, it is obvious to anyone skilled in the art that the present invention can also be applied to SIPTO without major change to the general principles.

(Embodiment 1)

Figure 1:
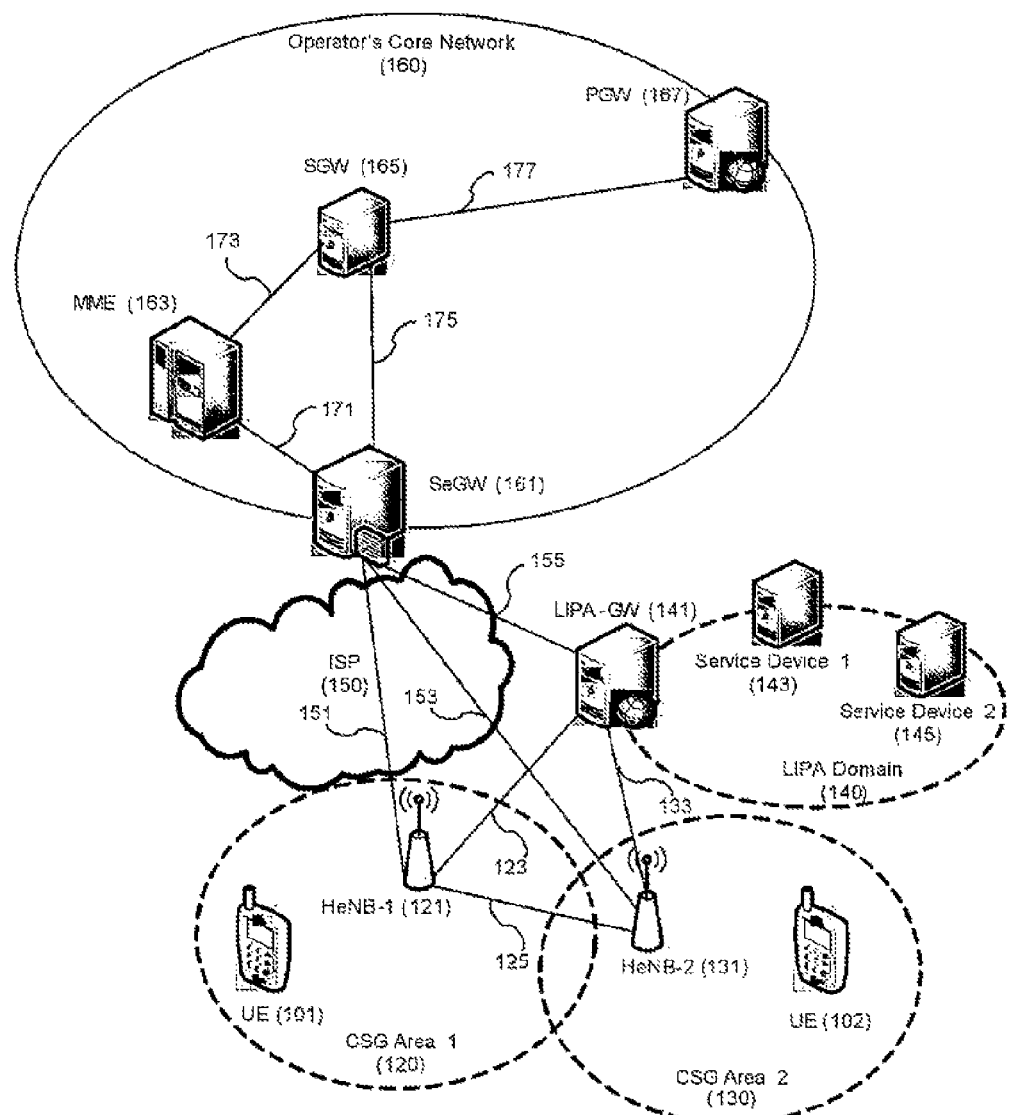
FIG. 1 is an example network architecture that supports the present invention.

With reference to FIG. 1, an example network configuration that the present invention can apply is illustrated.

As shown in FIG. 1, UE (101) is accessing the network via a HeNB-1 (121), which has a coverage area of CSG Area 1 (120). HeNB-1 (121) connects to the Security Gateway (SeGW) (161) in the Operator's Core Network (160) via link 151. Through the SeGW (161), the HeNB-1 (121) connects to the core network entities, Mobility Management Entity (MME) (163) and Serving Gateway (165).

Link 151 goes via an Internet Service Provider (ISP) domain (150). Depending on the deployment scenario, the ISP (150) may not belong to the mobile operator. In such case, communication between HeNB-1 (121) and SeGW (161) may be protected by security tunnels, e.g. IP Security (IPSec) tunnels. SeGW (161) allocates IP address, i.e. IP_CH1, to the HeNB-1 (121) during the process of establishing the security tunnel as defined in (Non Patent Literature 3). The HeNB-1 (121) uses IP_CH1 for communication with any operator core network entities as defined in (Non Patent Literature 2).

HeNB-1 (121) has a local IP address, i.e. IP_LH1, which is used for establishing the security tunnel with SeGW (161). This local IP address may be a public IP address or a private IP address that is allocated by the ISP (150) or a local domain. When a private IP address is used for IP_LH1, Network Address Translator (NAT) needs to be deployed between HeNB-1 (121) and SeGW (161). The NAT function is not illustrated in the architecture for simplicity reasons. It is obvious to anyone skilled in the art that there may be other node between the HeNB-1 (121) and the SeGW (161), e.g. nested NAT, etc. without affecting the general principle of the invention.

A LIPA Gateway (LIPA-GW) (141) providing the entry point to the LIPA Domain (140), similar to the local gateway (L-GW) of (Non Patent Literature 4), is located close to the HeNB-1 (121) or collocated with the HeNB-1 (121). The LIPA-GW (141) has a local IP address, i.e. IP_LG1, which is either a public IP address or a private IP address allocated by the ISP (150) or other domain operator. It is obvious to anyone skilled in the art that there can be different ISPs for the HeNB-1 (121) and LIPA-GW (141) to connect to. The LIPA-GW (141) can make use of the security tunnel establishment process defined in (Non Patent Literature 3) to connect to the SeGW (161). A core network IP address, i.e. IP_CG1, will be allocated by the SeGW (161) to the LIPA-GW (141). LIPA-GW will make use of this address to communicate with operator's core network entities, e.g. MME (163) and SGW (165), etc.

When LIPA path optimization is possible, the HeNB-1 (121) can establish a direct communication connection with the LIPA-GW (141), i.e. link 123. In this case, the LIPA traffic from the UE (101) can be routed directly to the LIPA Domain (140) without going through the operator's core network (160).

It is obvious to anyone skilled in the art that other than providing access to the devices in the LIPA Domain (140), e.g. Service Device 1 (143) and Service Device 2 (145), LIPA-GW (141) may also provide access to the general Internet via the LIPA Domain (140) or directly. This does not affect the general principle of the present invention.

At certain point of time, the UE (101) may move to another location 102, e.g. under the coverage of HeNB-2 (131). The HeNB-2 (131), similar to HeNB-1 (121), is connected to the operator's core network (160) via the SeGW (161). It also has two IP addresses, e.g. a local IP address IP_LH2, and a core network address allocated by SeGW (161) IP_CH2. It is obvious to anyone skilled in the art that the HeNB-2 (131) may be connected via a different SeGW than that of the HeNB-1 (121).

When the UE (101) moves towards location 102, the radio connection with HeNB-1 (121) will be disconnected, and new radio connection to HeNB-2 (131) will be setup. During the process, communication traffic for the UE (101) will be forwarded to achieve seamless handover.

Figure 2:
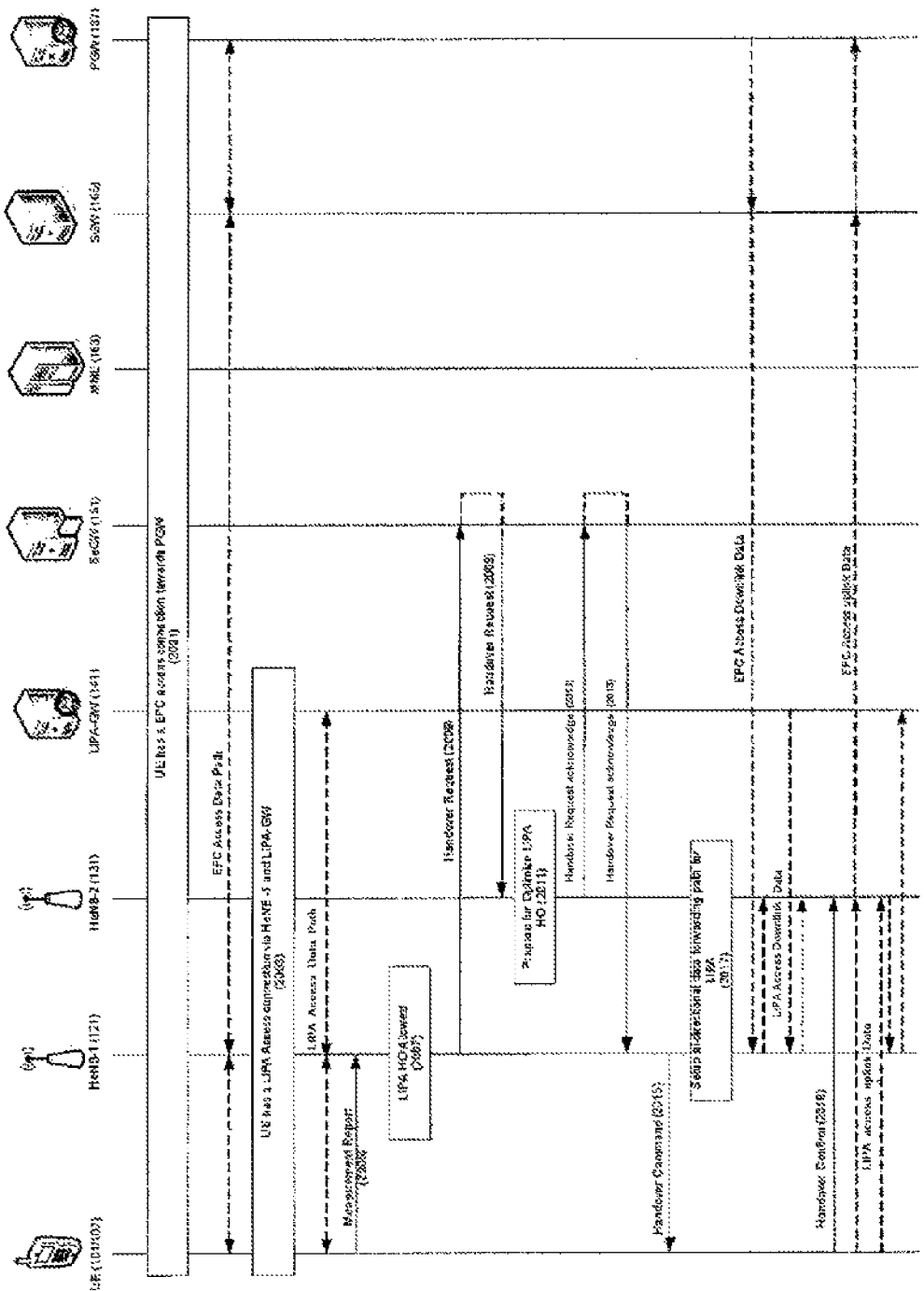
FIG. 2 is an example operation sequence of the present invention for handover preparation and execution.

With reference to FIG. 2, an example operation sequence of the present invention is shown. UE (101) has a connection established for accessing the Evolved Packet Core (EPC) services through PDN Gateway (PGW) (167), as in step 2001, This could be achieved by following the PDN connection setup or Attach procedure defined in (Non Patent Literature 2). Traffic path for the uplink and downlink is as following: UE (101)-HeNB-1(121)-SeGW(161)-SGW(165)-PGW (167).

At certain point of time, the UE (101) starts to establish a connection for the LIPA service via the LIPA-GW (141), as in step 2003. This could be achieved by carrying out procedures defined in (Non Patent Literature 4). In case the LIPA-GW (141) is not collocated with HeNB-1 (121), local addressing information of the HeNB-1 (121) and LIPA-GW (141) is exchanged during the LIPA connection establishment process. For example, during the PDN Connection establishment process, IP_LH1 will be passed to LIPA-GW (141) using the Create Session Request or Modify Bearer Request defined in (Non Patent Literature 2). Similarly, the IP_LG1 will be passed to HeNB-1 (121) using the Bearer Setup Request.

Additional information, e.g. the identifier for the connection or bearer, will be also passed together, e.g. TEIDs used by HeNB-1 (121) and LIPA-GW (141), EPS Bearer IDs, UE (101)'s IMSI or MSISDN, or a special LIPA session ID created by LIPA-GW (141). This identifier information can be used by HeNB-1 (121) and LIPA-GW (141) to identify the proper bearer for placing the uplink or downlink data packets for the UE (101).

In an alternative operation, the local address information of the LIPA-GW (141) and the TEID allocated for the LIPA PDN Connection will be passed from LIPA-GW (141) to the SGW (165) in the Create Session Response. In this case, IP_LG1 should be used in the "S5/S8-U PGW F-TEID" element of the "Bearer Context Created" IE. When the MME (163) sends the Bearer Setup Request to the HeNB-1 (121), it includes the "S5/S8-U PGW P-TEID" in the message. Therefore, the HeNB-1 (121) would be able to obtain the local address of the LIPA-GW (141) from the Bearer Setup Request, and initiates the setup of the connection for LIPA service. This can be achieved by sending a Connection Establishment message towards the LIPA-GW (141). An example of such Connection Establishment in implementation could be the Create Session Request message as defined in [2], or any other typical tunnel management protocol, e.g. IKEv2, etc. In this Connection Establishment message, the HeNB-1 (121) also includes its local address, i.e. IP_LH1, and the TEID allocated by the HeNB-1 (121) corresponding to the LIPA connection. With such information, the LIPA-GW (141) would know how to route the LIPA traffic for the UE (101) to the HeNB-1 (121) via the proper tunnel.

It is obvious to anyone skilled in the art that there will be additional information can be passed along, e.g. security keying materials for establishing security tunnels.

Using the local addressing information, e.g. IP_LH1 and IP_LG1, and the additional information, a direct connection between HeNB-1 (121) and LIPA-GW (141) will be established. At this point of time, the data path for the LIPA traffic is as following: UE(101)-HeNB-1(121)-LIPA-GW(141) for both uplink and downlink. From LIPA-GW (141), traffic will go to/from the actual LIPA service device, e.g. Service Device 1 (143) and/or Service Device 2 (145). It is obvious that there may be additional devices in between, e.g. routers, etc.

The HeNB-1 (121) and LIPA-GW (141) can reuse the security mechanism used with SeGW (161) for this direct connection, e.g. IKEv2 and IPSec. Therefore, no additional protocol stack is required on HeNB-1 (121) and LIPA-GW (141).

It is obvious to anyone skilled in the art that the UE (101) may establish multiple LIPA and/or SIPTO connections (e.g. multiple PDN connections or EPS bearers for LIPA and/or SIPTO) under HeNB-1 (121), for example to access services from Service Device 1 (143) and Service Device 2 (145) respectively. In that case, multiple direct connections (e.g. PDN connections) or multiple sub-connections (e.g. EPS bearers) between HeNB-1 121 and LIPA-GW (141) will be established, with each corresponds to a LIPA or SIPTO connection.

It is obvious to anyone skilled in the art that the Service Device 1 (143) and Service Device 2 (145) may be accessed via different LIPA-GWs. In such cases, there will be multiple direct connections established from HeNB-1 (121) to these different LIPA-GWs.

When the UE (101) is leaving the HeNB-1 (121)'s coverage, i.e. CSG Area 1 (120), the radio layer will be triggered to send a Measurement Report (2006) based on configuration set by the HeNB-1 (121). In the Measurement Report (2006), the UE (101) would include the information regarding the HeNB-2 (131). For example, the information may include one or more of the following:

Physical Cell ID
E-UTRAN Cell Global ID (ECGI)
Close Service Group ID (CSG ID)
Operation mode, e.g. closed, hybrid, open. etc.
LIPA or SIPTO support indication
Radio layer information
Proximity information
Indication of whether UE (101) belongs to the CSG It is obvious to anyone skilled in the art that the UE (101) may reports other information, e.g. those defined in (Non Patent Literature 6). For example, if there are other HNB/HeNB's around the same area and are visible to UE (101), the Measurement Report may also include information about these cells.

It is also obvious that the Measurement Report (2005) may include multiple message exchanges as described in (Non Patent Literature 6). For example, the UE (101) sends a set of information in the first Measurement Report message, and the HeNB-1 (121) may request the UE (101) to report further information using a Measurement Configuration. Thus, UE (101) would send another Measurement Report to the HeNB-1 (121) to report additional information about a particular cell.

After receiving the Measurement Report (2005), HeNB-1 (121) may select a target cell for the UE (101) to handover to, based on the reported information, as in step 2007. Assume that the HeNB-1 (121) selects HeNB-2 (131) as the target cell based on the radio layer information, HeNB-1 (121) will verify if a LIPA handover to the target cell is possible and allowed.

The HeNB-1 (121) would have a context for each of the LIPA connections established at step 2003. A possible format for the context is as following:

{Default Bearer ID}
{EPS Bearer ID}
{Radio Bearer ID}
{LIPA Flag]
{LIPA Restriction List}
{Address of the LIPA-GW}
{Address of HeNB used for LIPA}
{CSG ID}
{CSG membership}
{LIPA traffic limit}
{QoS parameters}
{Security association}

The address of the LIPA-GW may further contain TEID of the LIPA-GW. Also the Address of HeNB used for LIPA may further contain TEID of HeNB used for LIPA.

It is obvious to anyone skilled in the art that the context information may be different depends on the protocol selected by the operator between the Serving Gateway and PDN Gateway. For example, if the PMIP (Proxy Mobile IP) is used, the TEIDs may be replaced by the GRE keys. In addition, if the IKEv2 and IPSec are used for the tunnel management between the HeNB-1 (121) and the LIPA-GW, the Security association may be also used for identifying the tunnels, e.g. storing the PSI for the IPSec.

Using this context and the selected target cell information, HeNB-1 (121) decides for each LIPA connection if mobility is supported. This can be achieved by checking the target cell, e.g. of HeNB-2 (131), against the "LIPA Restriction List" and "LIPA traffic limit".

If the HeNB-1 (121) at step 2007 decides that the LIPA connection is suitable for handover (i.e. mobility is supported for at least one of existing LIPA connections), it would include the LIPA connection bearer information along with the EPC access bearer information in the Handover Request (2009) message towards the target cell, HeNB-2 (131).

In the Handover Request (2009) message, the "E-RABs To Be Setup item" for each of the LIPA Connection Bearers will include one or more of the following information:

{E-RAB ID}
{QoS Parameters}
{DL Forwarding}
{UL GTP Tunnel Endpoint}
{LIPA Flag}
{LIPA-GW Address}
{LIPA Restriction List}
{LIPA Traffic Limit}
{LIPA UL Tunnel Endpoint}
{LIPA DL Tunnel Endpoint}
{Security associations}

Among them, the "LIPA flag", "LIPA Restriction List", "LIPA Traffic Limit", "LIPA UL Tunnel Endpoint", and "Security Associations" would only be included if the LIPA Flag indicates that it is a local LIPA access with direct connection. "LIPA DL Tunnel Endpoint" will be included regardless of "LIPA Flag" value.

The "LIPA Flag", "LIPA Restriction List", and "LIPA Traffic Limit" are obtained from the corresponding LIPA connection context at the HeNB-1 (121).

The "LIPA UL Tunnel Endpoint" is a new tunnel end points allocated by the HeNB-1 (121) for this particular LIPA connection bearer. It allows the HeNB-1 (121) to receive uplink packets from the target cell. HeNB-1 (121) will associate this "LIPA UL Tunnel Endpoint" with the "LIPA-GW Address" (421), such that data received on this tunnel end points can be forward to the correct LIPA-GW (141) over the correct bearer.

The Handover Request (2009) will be sent via the secure tunnel between the HeNB-1 (121) and SeGW (161) towards the target cell's address, i.e. the IP_CH2 of the HeNB-2 (131). This Handover Request (2009) would be routed by the SeGW (161) towards the HeNB-2 (131) via the secure tunnel between them.

The reason for this is because the X2 interface establishment may be required to go via the SeGW (161). Therefore, HeNB-1 (121) and HeNB-2 (131) may only know each other via the core network address, e.g. IP_CH1 and IP_CH2. In case that there are H(e)NB-GW deployed, the X2 interface may also be required to go through the H(e)NB-GW.

In case there is no requirement for the X2 interface to go through H(e)NB-GW or no H(e)NB-GW deployed, the above Handover Request (2009) message can be sent directly over the secure connection between the HeNB-1 (121) and HeNB-2 (131).

"LIPA UL Tunnel Endpoint", "LIPA DL Tunnel Endpoint" and "UL GTP Tunnel Endpoint" can be differentiated per PDN connection or EPS bearer, or can be shared among PDN connections or EPS bearers, such that the QoS and/or security requirements from applications or network operators, etc. will be ensured.

If LIPA mobility is not to be supported, or any of service requirements, e.g. QoS, for the LIPA is not to be supported, towards the target cell, HeNB-1 (121) can take various actions based on local policy or configurations, e.g. not including the LIPA connection bearer information in the handover request, or including LIPA connection bearer information with a flag indicating not for handover, etc. HeNB-1 (121) may also send a trigger to UE (101) for indicating to the user that the LIPA connection is about to be torn down, before sending a signaling message to the LIPA-GW (141) to tear down the LIPA connection, such that the user can take proper action, e.g. establishing another connection instead of the existing LIPA connection, to stay at HeNB-1 coverage, etc.

The "LIPA Restriction List" and "LIPA traffic limit" can be configured with different approaches. One possible way is for the operator's core network to configure the HeNB-1 (121) via LIPA Connection Establishment process. For example, MME (163) may include the two elements in the S1AP Bearer Setup Request. MME (163) can obtain the information as part of the UE (101) subscription profile, or via Operation and Management (OAM) system, or from the LIPA-GW (141) and SGW (165) through the Create Session Request/Response process.

Alternatively, the HeNB-1 (121) may obtain the "LIPA Restriction List" and "LIPA traffic limit" via some enhance policy framework. Or, the HeNB-1 (121) can be configured by the (OAM) system directly.

In certain deployment, there may be a HNB/HeNB Gateway (H(e)NB-GW) existing between the HNB/HeNB and MME (163). In that case, the "LIPA Restriction List" and "LIPA traffic limit" sent by the MME (163) may be processed and stored on the H(e)NB-GW. In such case, HNB/HeNB will have empty "LIPA Restriction List" and "LIPA traffic limit". If the HeNB-1 (121) sees an empty "LIPA Restriction List" and "LIPA traffic limit" element the LIPA context, it will consider LIPA connection mobility is supported. Therefore, it will initiate handover for the LIPA connection. The handover signaling will go through the H(e)NB-GW, for both S1 based and X2 based handover. The H(e)NB-GW will then make use of the "LIPA Restriction List" and "LIPA traffic limit" information to evaluate if the LIPA connection should be handed over. Error will be returned to the HeNB-1 (121) if the LIPA connection is judged to be not suitable for handover by the H(e)NB-GW.

When the HeNB-2 (131) receives the Handover Request and extracts the LIPA bearer information from the message (2009), it will try to check if the handover can be allowed based on local resources and policies, When processing the "E-RABs To Be Setup Item" that has the "LIPA Flag", HeNB-2 (131) will try to verify that the LIPA service to the LIPA-GW (141) indicated in "LIPA-GW Address" (506) can be supported. If some QoS is required by the HeNB-1 in the QoS Parameters, HeNB-2 may also consider if the QoS requirement can be ensured based on the obtained QoS Parameters. If the verification passes, HeNB-2 (131) will create a LIPA entry, and store the relevant information.

The HeNB-2 (131) will then respond with a Handover Request Acknowledge (2013) towards the HeNB-1 (121). In the "E-RABs Admitted Item" element of Handover Request Acknowledge (2013), following information is included:

{E-RAB ID}
{LIPA Flag}
{UL LIPA Tunnel Endpoint}
{DL LIPA Tunnel Endpoint}
{QoS Parameters}
{Security Associations}

The "UL LIPA Tunnel Endpoint" is the tunnel end point information on HeNB-2 (131) for forwarding the uplink LIPA traffic from UE (101) to the HeNB-1 (121)'s "LIPA UL Tunnel Endpoint" (509).

The "DL LIPA Tunnel Endpoint" is the tunnel end point information on HeNB-2 (131) for receiving the direct forwarded downlink LIPA traffic for UE (101) from the HeNB-1 (121).

"UL LIPA Tunnel Endpoint" and "DL LIPA Tunnel Endpoint" can be differentiated per PDN connection or EPS bearer, or can be shared among PDN connections or EPS bearers, such that the QoS and/or security requirements from applications or network operators, etc. will be ensured.

The "QoS Parameters" indicates the accepted QoS level for the LIPA connection at HeNB-2 (131). And the "Security Association" contains the keying material that can be used by the HeNB-1 (121) to derive the keys that will be used to protect the uplink and downlink traffic forwarded between HeNB-1 (121) and HeNB-2 (131).

In case that multiple LIPA connections or LIPA bearers established are target for handover, the "Security Association" can be differentiated per LIPA connection or bearer, such that it can change security level or security method to be applied per connection or bearer according to the security requirement from applications or network operators, etc.

The Handover Request Acknowledge (2013) message flows in the reverse direction of the Handover Request (2009) message. It also contains all the necessary information to support the handover of the EPC Access connections, as defined in (Non Patent Literature 5).

Once received the Handover Request Acknowledge (2013) message, HeNB-1 (121) extract the needed information for each of the bearer, and form a Handover Command (2015) to the UE (101).

When the LIPA Connection bearers are accepted by the HeNB-2 (131), HeNB-1 (121) will make use of the information in "E-RABs Admitted Item" element to establish direct tunnels for bi-directionally forwarding UE (101)'s LIPA traffic, as indicated in 2017. It is obvious to anyone skilled in the art that this could be two separate) tunnels, each for one direction, or one bi-direction tunnels.

The downlink direct forwarding tunnel is established using the information in the "LIPA DL Tunnel Endpoint" (510) and "DL LIPA Tunnel Endpoint" (604). Both EPC Access and LIPA Access may make use of this tunnel.

The uplink forwarding tunnel is established using the information in the "LIPA UL Tunnel Endpoint" (509) and "UL LIPA Tunnel Endpoint" (603) for LIPA Access bearers. For EPC Access bearers, "UL GTP Tunnel Endpoint" (504) and HeNB-2 (131)'s IP_CH2 address will be used for direct sending to the SGW (165) via SeGW (161).

It is obvious to anyone skilled in the art that the "LIPA DL Tunnel Endpoint" (510), "DL LIPA Tunnel Endpoint" (604), "LIPA UL Tunnel Endpoint" (509) and "UL LIPA Tunnel Endpoint" (603) may include additional information than just IP address for the tunnel establishment. For example, it may include some domain names, host names, VLAN tag IDs, etc. In case HeNB-1 (121) and HeNB-2 (131) has NAT device in between, some NAT Traversal information may be provided as well, e.g. some STUN Server address, some rendezvous point address, etc.

When the HeNB-1 (121) detects the loss of radio connection to the UE (101), it can forwards the received downlink traffic for both LIPA and EPC access to the target HeNB-2 (131) via the direct tunnel from HeNB-1 (121) to HeNB-2 (131).

Therefore, at this point, the downlink data path for the EPC Access is PGW (167)-SGW(165)-SeGW(161)-HeNB-1 (121)-HeNB-2(131). And, the downlink data path for the LIPA Access is LIPA-GW (141)-HeNB-1(121)-HeNB-2 (131).

When the UE (101) moves to the new location 102, and executes the handover by following information in the Handover Command (2015), it will establish radio connection with HeNB-2 (131). If everything successful, UE (102) will send a Handover Confirm (2019) message to the HeNB-2 (131). After this, UE can send uplink traffic via HeNB-2 (131).

As according to the previous description, for LIPA Access bearers, the HeNB-2 (131) has established uplink direct tunnel to HeNB-1 (121), and therefore the LIPA traffic will be forwarded via HeNB-1 (121). The LIPA uplink data path for the UE (102) is thus: UE(102)-HeNB-2(131)-HeNB-1(121)-LIPA-GW(141). Obvious, this way, the LIPA traffic is kept within the local network, i.e. it does not traverse the Operator's Core Network (160), so that delay for the traffic forwarding is reduced.

The EPC Access uplink data path is now: UE(102)-HeNB-2(131)-SeGW(161)-SGW(165)-PGW(167).

Figure 3:
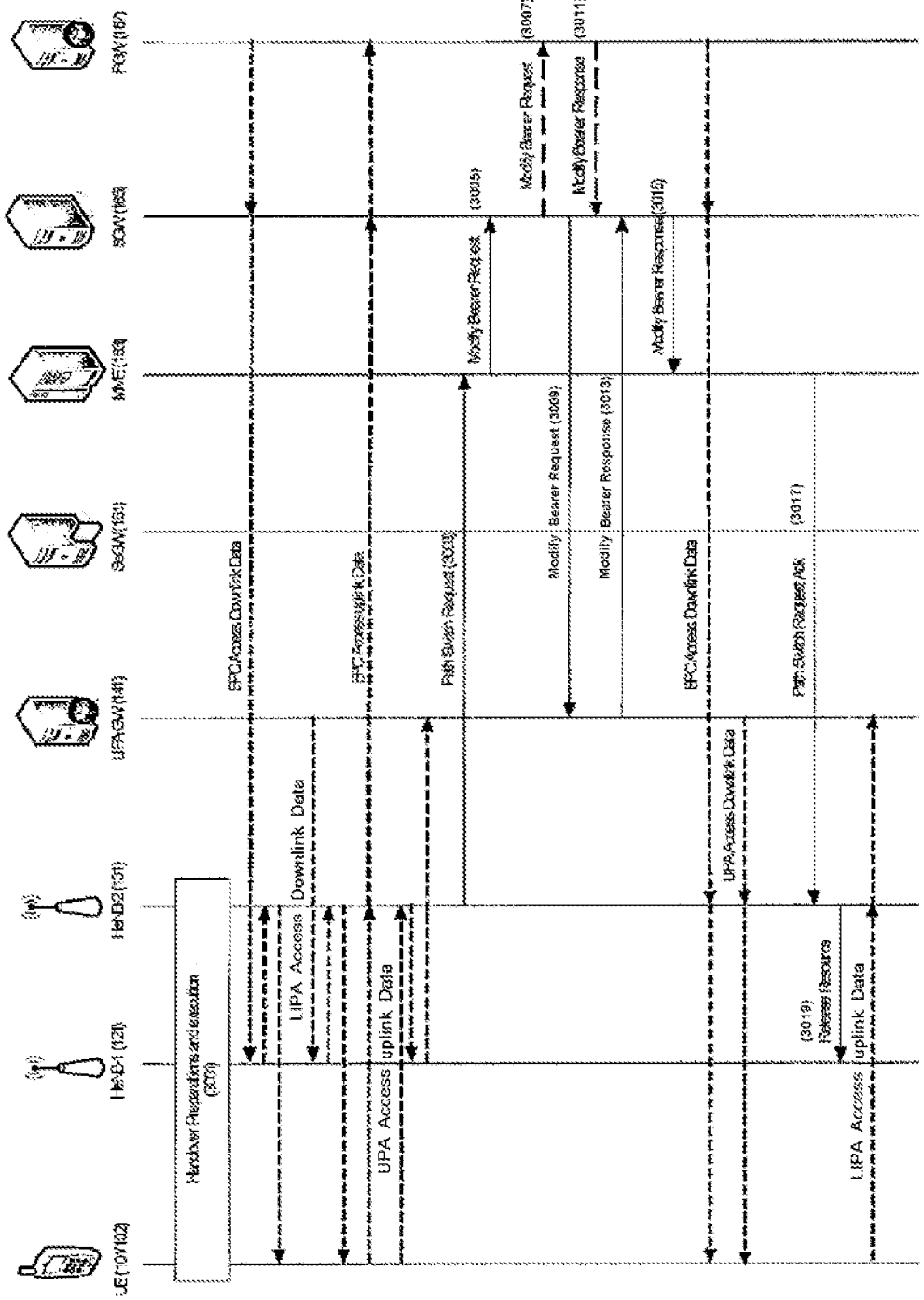
FIG. 3 is an example operation sequence of the present invention for handover completion.

With reference to FIG. 3, an example operation sequence of the present invention is illustrated. This operation is for informing the LIPA-GW (141) of the new HeNB-2(131) address during the handover completion phase. The operation starts at the state where the operation (Handover Preparation and execution (3001)) illustrated in FIG. 2 finishes. Therefore, the EPC downlink data path is PGW(167)-SGW(165)-SeGW(161)-HeNB-1(121)-HeNB-2(131)-UE(102). The LIPA Access downlink data path is: LIPA-GW (141)-HeNB-1(121)-HeNB-2(131)-UE(102), The EPC access uplink data path is UE(102)-HeNB-2(131)-SGW (165)-PGW(167). And, the LIPA Access uplink data path is UE(102)-HeNB-2(131)-HeNB-1(121)-LIPA-GW(141).

When the HeNB-2 (131) detected the connection from UE (102) e.g. the Handover Confirm (2019), it will send a Path Switch Request (3003) towards MME (163). This message will goes through the SeGW (161), or a H(e)NB-GW if it exists.

The "E-RABs Switched in Downlink Item IEs" of the Path Switch Request (3003) will include the following information:

{E-RAB ID}
{Transport Layer Address}
{GTP-TEID}
{LIPA Flag}
{DL LIPA Tunnel Endpoints}
{UL LIPA Tunnel Endpoints}
{Security Associations}

After receiving this Path Switch Request (3003), MME (163) sends a Modify Bearer Request (3005) message to SGW (165) as defined in (Non Patent Literature 2). In the Modify Bearer Request (3005), MME includes the "E-RABs Switched in Downlink Item IEs" described above.

SGW (165) may send a Modify Bearer Request (3007) and receive a Modify Bearer Response (3011) from the PGW (167). The details about this signaling are the same as that defined in (Non Patent Literature 2).

When the SGW (165) sees an "E-RABs Switched in Downlink item IEs" that has the "LIPA Flag" (704) set to local LIPA with direct connection, it will send a Modify Bearer Request (3009) to the LIPA-GW (141), including the "E-RABs Switched in Downlink Item IEs".

In an alternative operation, the HeNB-2 (131) can send directly to the LIPA-GW (141) a Path Update message, carrying information about the LIPA connections, i.e. the "E-RABs Switched in Downlink Item IEs" that has the "LIPA Flag" (704) set. In case there are multiple LIPA-GWs for the same UE, the HeNB-2 (131) would send the messages to the corresponding LIPA-GW respectively. This Path Update message can take the form of some IKEv2 message, or an adapted Modify Bearer Request (3007) that carries the TEID to identify the LIPA connection.

After received the Modify Bearer Request (3009), the LIPA-GW (141) checks the "E-RABs Switched in Downlink Item IEs" and corresponding CSG and location information, and verifies if the LIPA service can be supported. If the verification is successful, LIPA-GW (141) will send a Modify Bearer Response (3013) towards the SGW (165).

Figure 7:
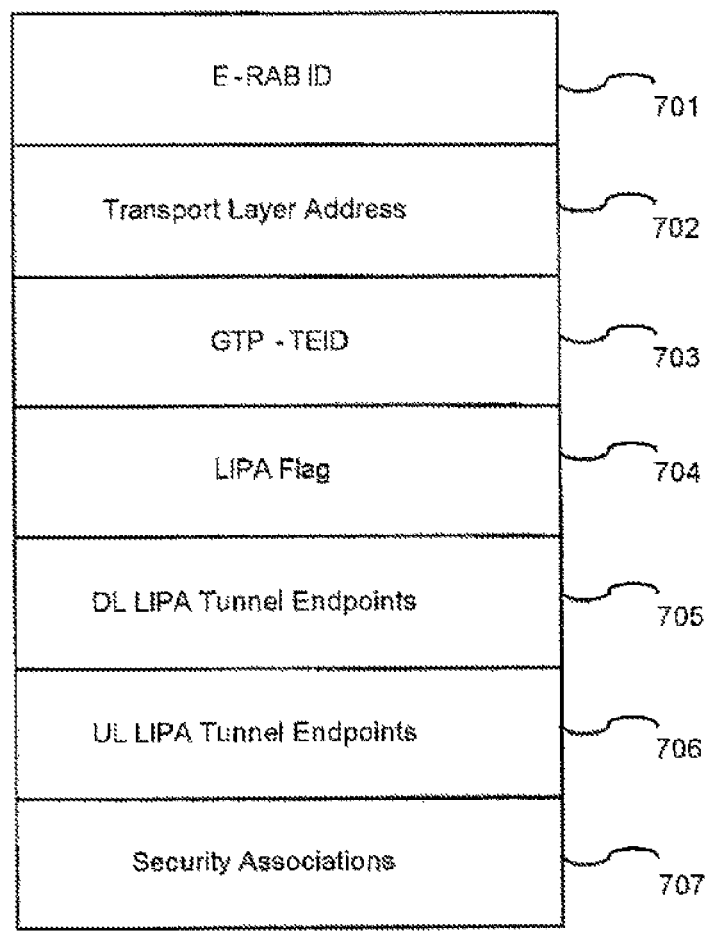
FIG. 7 is an example format "E-RABs Switched in Downlink Item IEs" of the Path Switch Request message.

Inside the Modify Bearer Response (3013), the LIPA-GW (141) includes the "E-RABs Switched in uplink Item IEs" element that is of the same format as "E-RABs Switched Downlink Item IEs" shown in FIG. 7. The only difference is that the information about the Tunnel Endpoints is referring to the LIPA-GW (141). For example, the "UL LIPA Tunnel Endpoints" contains the local address of the LIPA-GW (141), i.e. IP_LG1 and corresponding TEIDs. HeNB-2 (131) should send the uplink LIPA traffic from the UE (102) to this address.

The SGW will send a Modify Bearer Response (3015) to the MME (163), including the "E-RABs Switched in uplink Item IEs".

At this point of time, downlink data paths for the EPC Access and LIPA Access are switched. For example, the EPC Access downlink data path is now from PGW (167)-SGW (165)-SeGW(161)-HeNB-2(131)-UE(102). And the LIPA Access downlink data path is LIPA-GW (141)-HeNB-2 (131)-UE(102).

LIPA-GW (141) uses the "DL LIPA Tunnel Endpoints" (705) element in the "E-RABs Switched in downlink Item IEs" of received Modify Bearer Request (3009) to create the direct connection towards the HeNB-2 (131)'s local address, IP_LH2.

In an alternative operation, the LIPA-GW (141) would send a Path Update Ack message back towards the HeNB-2 (131), if it received the Path Update message from the HeNB-2 (131) in the previous step. The Path Update Ack message carries the "E-RABs Switched in uplink Item IEs" element and other information necessary for the direct communication between the LIPA-GW (141) and the HeNB-2 (131), e.g. the TEID, or PSI, etc.

It is obvious to anyone skilled in the art that in case the LIPA-GW (141) and HeNB-2 (131) are not in the same subnet or domain, additional information included in the "DL LIPA Tunnel Endpoints" may help, for example, some NAT Traversal information, e.g. some STUN Server address, some rendezvous point address, etc.

The MME (163) will send a Path Switch Request Ack (3017) to the HeNB-2 (131). The same "E-RABs Switched in uplink Item IEs" element will be included.

After receiving this message, HeNB-2 (131) will start to establish direct uplink connection to the LIPA-GW (141). It can make use of the "UL LIPA Tunnel Endpoints" information in the "E-RABs Switched in uplink Item IEs" element to establish the forwarding tunnel. Alternatively, the LIPA-GW (141) can choose not to respond the "UL LIPA Tunnel Endpoints". In that case, the HeNB-2 (131) can make use of the "UL GTP Tunnel Endpoint" (504) received in Handover Request (2009) to establish the direct forwarding tunnel.

After the successful establishment of the direct tunnel, the HeNB-2 (131) will switch the uplink data path for the LIPA traffic from the UE (102). The new uplink data path for LIPA will be UE(102)-HeNB-2(131)-LIPA-GW(141).

"UL LIPA Tunnel Endpoint", "DL LIPA Tunnel Endpoint" and "GTP TEID" can be differentiated per PDN connection or EPS bearer, or can be shared among PDN connections or EPS bearers, such that the QoS and/or security requirements from applications or network operators, etc. will be ensured.

The "Security Associations" is used to protect the connection between the HeNB-2 and the LIPA-GW. The uplink and downlink packets for the UE will be forwarded via the forwarding tunnel between HeNB-1 and HeNB-2 at least until the secure connection is established between HeNB-2 and LIPA-GW based on the "Security Associations".

The "Security Associations" may be inserted by an intermediate node in the operator's core network, e.g. H(e)NB-GW, SeGW, MME, etc., so that the operator can decide if and what kind of security protection is required for the connection between the HeNB-2 and LIPA-GW and maintain the connection even when the connection is in the local area of the customer premise or office. The LIPA-GW obtains the "Security Associations" through Modify Bearer Request (3009) and configure with it to establish the connection to the HeNB-2. As well, the HeNB-2 obtains the "Security Associations" through Path Switch Request Acknowledge (3017) and configure with it to establish the connection to the LIPA-GW. The secure connection establishment is initiated by either the HeNB-2 or the LIPA-GW.

The "Security Associations" and the secure connection between the HeNB-2 and the LIPA-GW can be differentiated per PDN connection or EPS bearers for LIPA, or can be shared among the PDN connections or EPS bearers for LIPA, such that security level can be ensured per characteristic of connections (i.e. PDN connection, EPS bearer).

The forwarding tunnel between HeNB-1 and HeNB-2 may be kept established, e.g. for a while, after handover completed, so that it can be utilized for other handover procedures afterwards and it doesn't require any more time to be consumed at the following handover (i.e. handover delay will be reduced). It may be torn down when the HeNB is powered off or low power mode, for example, in very late evening.

Otherwise, the forwarding tunnel may be torn down soon after the handover completion, such that the resource on the HeNB can be utilized efficiently. This is one of advantages in a case where the forwarding tunnel is established based on QoS or security parameters that can be differentiated per connection or bearer.

During the secure connection establishment between HeNB-2 and LIPA-GW, another handover to other HeNB (e.g. HeNB-3; not in the figure) may be decided to perform, i.e. HeNB-2 may decide handover to HeNB-3 based on the measurement report from the UE. In such a case, the forwarding tunnel between HeNB-1 and HeNB-2 is still utilized for forwarding UE's uplink/downlink packets.

In order to avoid loss of UE's packet, HeNB-2 will perform the procedure with HeNB-3 as previously described in this embodiment and will further forward the packets between HeNB-3 and HeNB-1. Otherwise, HeNB-2 may inform HeNB-1's information (i.e. address, tunnel end point, security parameters) during the procedure, so that HeNB-3 will establish connection with HeNB-1 for packet forwarding for the UE. At this point when the HeNB-2 decides another handover to other HeNB (HeNB-3), HeNB-2 may stop secure connection establishment with LIPA-GW to reduce unnecessary resource consumption.

(Embodiment 2)

Figure 4:
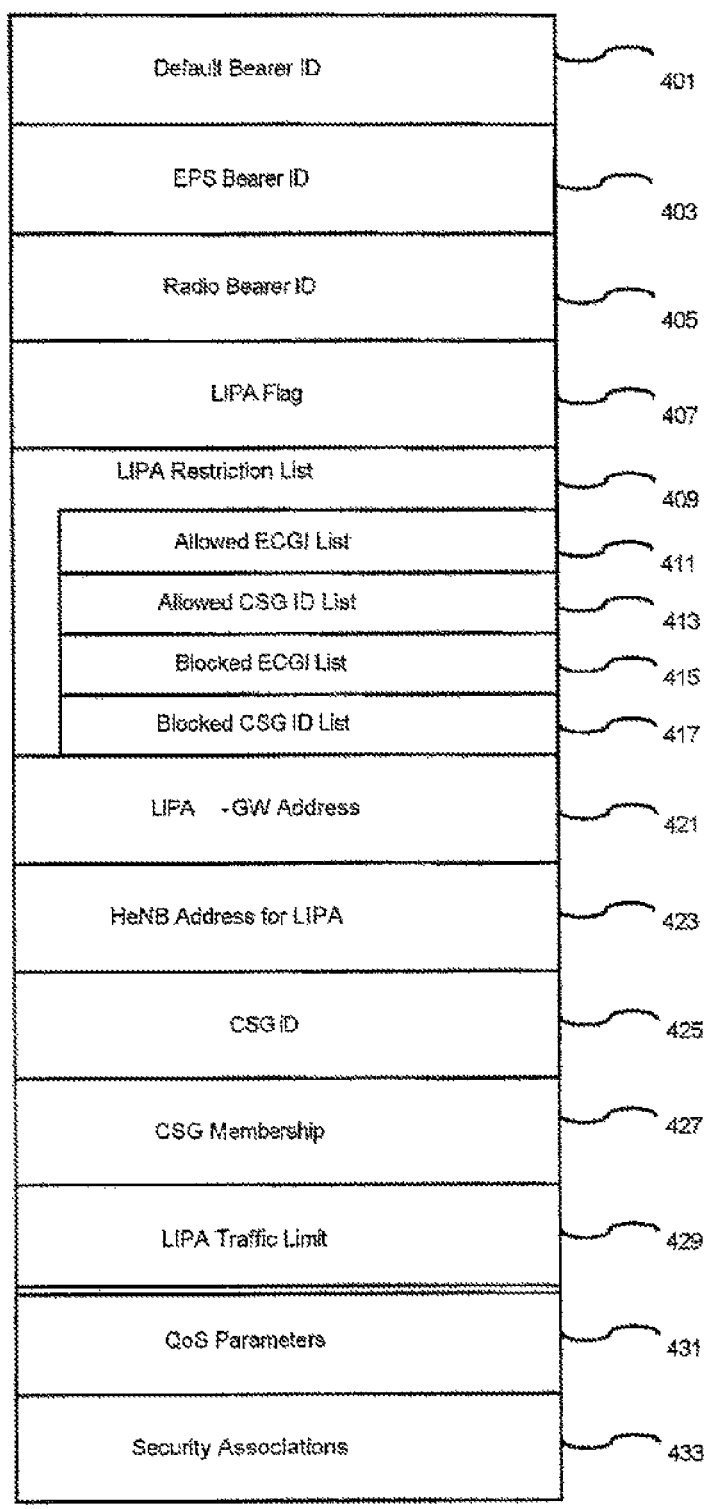
FIG. 4 is an example format of the LIPA Connection context stored in the HeNB.

With reference to FIG. 4, the possible format of the LIPA context for each of the LIPA connections on the HeNB for a particular UE (101) is illustrated.

Among the context information, The "Default Bearer ID" (401) and "EPS Bearer ID" (403) are identifiers used by the operator's core network, e.g. MME, to identify the LIPA connections and bearers associated with them.

The "Radio Bearer ID" (405) is the identifier for the HeNB-1 (121)'s radio bearers allocated to the UE (101) for the LIPA connection. In certain operations, it can also take a form of the TEID allocated by the HeNB for the LIPA connection.

The "LIPA Flag" (407) is indicating whether this connection is for LIPA, and whether it is a local or remote. Possible value of the "LIPA Flag" could be:
- Local LIPA with direct connection from HNB/HeNB to LIPA-GW
- Local LIPA without optimization, i.e. go via operator's core network
- Remote LIPA with direct connection from NB/eNB or HNB/HeNB to LIPA-GW
- Remote LIPA without optimization, i.e. go via SGW In an alternative operation, the "LIPA Flag" can be implicitly inferred from the existence of the other information elements, e.g. the "Address of the LIPA-GW". In such cases, the "LIPA Flag" information element would not be present in the context.

The "LIPA Restriction List" (409) is indicating whether LIPA mobility should be supported. It may contain a list of ECGIs or CSG IDs and corresponding mobility levels. An example of the "LIPA Restriction List" is as following:
- Allowed ECGI List (411):
- ECGI 1: Mobility supported, direct connection, no packet loss.
- ECGI 2: Mobility supported, indirect connection, deliver in order
- Allowed CSG ID List (413):
- CSG ID 1: Mobility supported, direct connection
- Blocked ECGI List (415):
- ECGI 1: No mobility
- Blocked CSG ID List (417):
- CSG ID 2: No mobility It is obvious to anyone skilled in the art that in certain implementation, the "Blocked ECGI List" (415) and "Blocked CSG ID List" (417) can be omitted. In that case, any cell that is not in the "Allowed ECGI List" (411) and "Allowed CSG ID List" (413) will be taken as blocked. When the "Blocked ECGI List" (415) and "Blocked CSG ID List" (417) do exist, those cells not in either of the list (411 to 417) are left for HeNB-1 (121) to decide on the proper action based on local policy or configuration. For example, LIPA handover can be initiated to those cells, and it is up to the target cell to decide if to accept.

The "Address of the LIPA-GW" (421) includes the necessary information stored for the LIPA-GW. It may include for example the local address of the LIPA-GW (141), i.e. IP_LG1, and the core network address of the LIPA-GW (141), i.e. IP_CG1. It also includes the GTP Tunnel IDs (TEIDs) used by the uplink and downlink user plane at LIPA-GW (141).

The "Address of HeNB used for LIPA" (423) are used to store the local address information used for this particular LIPA session. For example, it may include the IP_LH1 for HeNB-1 (121), and the TEIDs used for uplink and downlink at HeNB-1 (121). This is useful when the HeNB-1 (121) has multiple addresses, and different addresses are used for different LIPA connections.

The "CSG ID" (425) indicates the CSG ID of the HeNB-1 (121), and the "CSG membership" (427) indicates whether UE (101) is a member of the CSG ID.

This information could also be used by the source HeNB to decide if an X2 Handover should be carried out or a S1 Handover should be carried out. For example, if the target HeNB is of the same CSG ID, or of a hybrid or public operation mode, the source HeNB could try to initiate X2 Handover. Otherwise, the source HeNB shall try to involve the core network, e.g. MME, in the handover process.

The "LIPA traffic limit" (429) indicates the limit for the LIPA connection, for example the per APN maximum bit rates, i.e. APN-AMBR, or a volume limit, e.g. 300 MB, or a time limit, e.g. 30 minutes. This element may also indicate the consumed limit, e.g. 20 MB used, or 10 minutes used, etc. This will be helpful for locally manage the LIPA service at the HeNB-1 (121). When the limit is exceeded, the HeNB-1 (121) may locally decide on the proper actions, e.g. to trigger a LIPA connection teardown, reduce the QoS associated with the LIPA connection, trigger a notification to the UE (101) via a Paging message or radio layer message, etc.

The "QoS parameters" (431) is used to indicate the QoS level that is allocated to this LIPA connection and associated bearers. It may be for example the QCI and ARP as defined in (Non Patent Literature 2) or other type of QoS parameters depending on the access technology used on HeNB-1 (121).

The "Security association" (433) is the security key and keying materials for the secure connection with LIPA-GW (141) for this particular LIPA connection. For example, it could be encryption key and integrity protection key for the IPSec tunnel.

It is obvious to anyone skill in the art that there may be multiple bearers established for the same LIPA connection. In that case, for each of the dedicate bearers a context should be created on the HeNB-1 (121).

Figure 5:
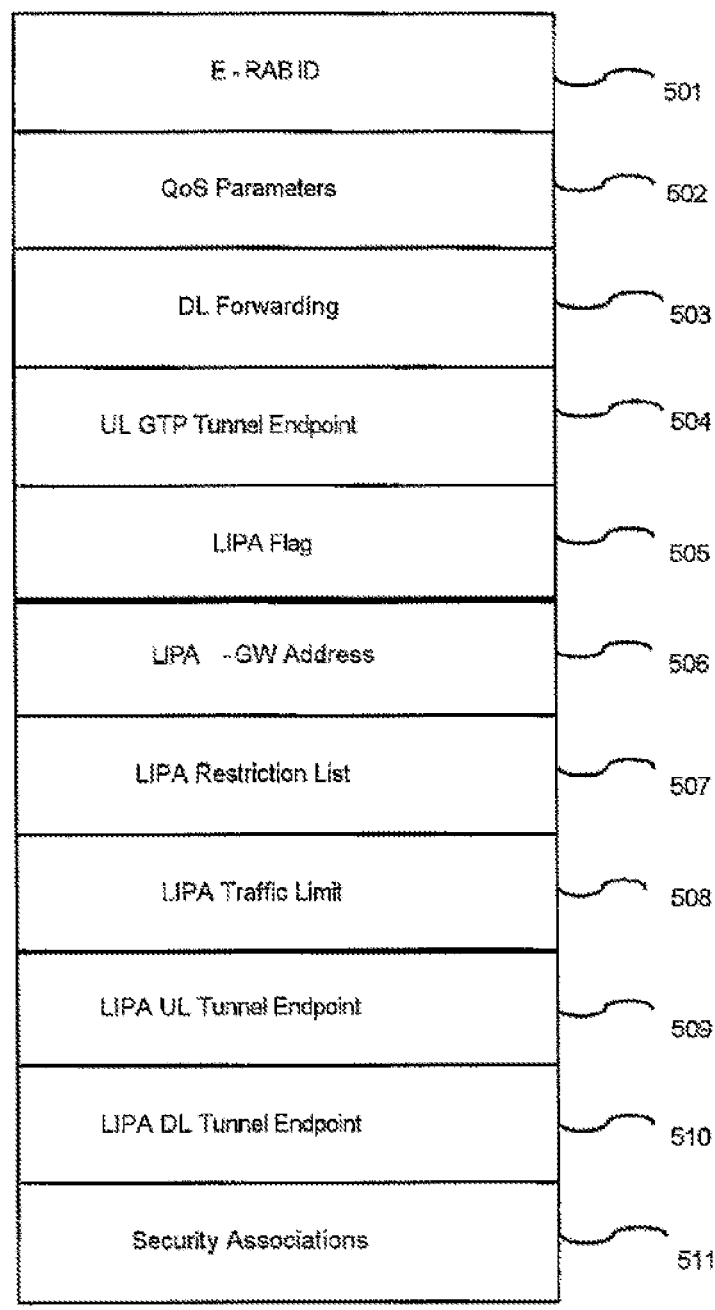
FIG. 5 is an example format of the "E-RABs To Be Setup Item" in the Handover Request message.

With reference to FIG. 5, and example format of the "E-RABs To Be Setup Item" in the Handover Request (2009) message is illustrated. Among them, the "E-RAB ID" (501), "QoS Parameters" (502), "DL Forwarding" (503), "UL GTP Tunnel Endpoint" (504) are following the format as defined in (Non Patent Literature 5).

The "LIPA Flag" (505) follows the same format as "LIPA Flag" (407).

The "LIPA-GW Address" (506) is the information derived from the APN used for LIPA and the address information from 421. Therefore, it could be a FQDN or an IP address, or some Domain Names.

The "LIPA Restriction List" (507) and "LIPA Traffic Limit" (508) follow the same format as that of 409 and 429.

The "LIPA UL Tunnel Endpoint" (509) includes the Local IP Address information of the source HeNB, e.g. HeNB-1 (121) and the Tunnel End Point ID (TEID). This would be used by the target HeNB as the destination to forward uplink LIPA traffic from the UE (101). It is obvious to anyone skilled in the art that the address information can be also presented in other forms, e.g. an FQDN, or a local hostname, MAC layer address, VLAN ID, etc. It is also possible that the TEID will be replaced by a port number if direct IP tunnel is used instead of GTP between the two HeNBs. In this case, the "LIPA UL Tunnel Endpoint" may also indicate the type of protocol to be used for the tunnel between the HeNBs.

The "LIPA DL Tunnel Endpoint" (510) includes the Local IP Address information of the source HeNB, e.g. IP_LH1 and the Tunnel End Point ID (TEID). This would be used by the source HeNB for forwarding downlink data towards the target HeNB, e.g. HeNB-2 (131). This information is to be included in case HeNB-2 (131) needs to bind the security with the forwarding tunnel end points.

The "Security Associations" (511) contains the keying material for deriving the security keys for the protection of the tunnel between the HeNBs. This could include also the security schemes or encryption and authentication algorithms to be used.

Figure 6:
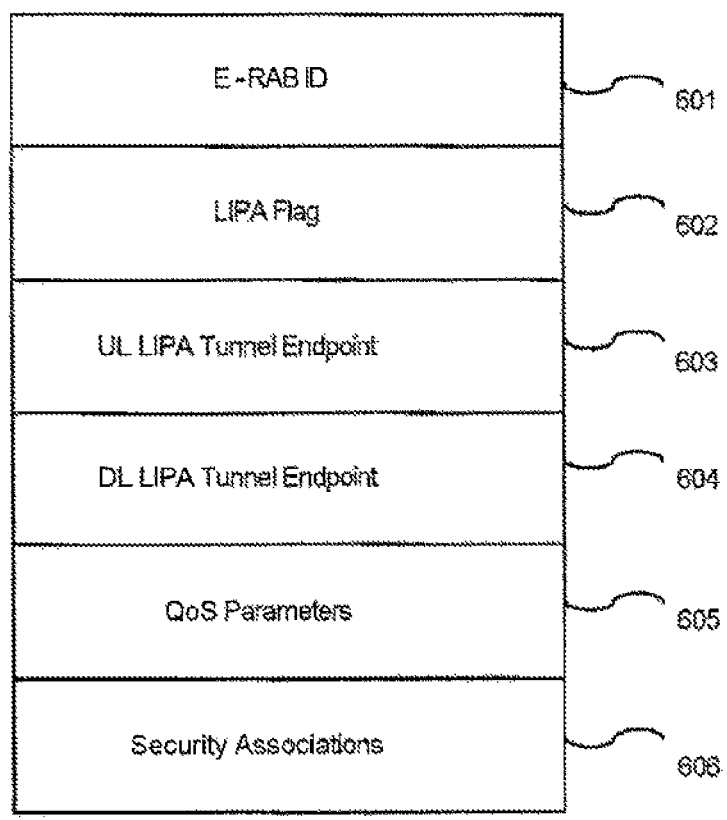
FIG. 6 is an example format of the "E-RABs Admitted Item" in the Handover Request Acknowledge message.

With reference to FIG. 6, an example format for the "E-RABs Admitted Item" in the Handover Request Acknowledge (2013).

The "E-RAB ID" (601) is using the format as defined in (Non Patent Literature 5). The "LIPA Flag" (602) is following the same format as the 505. The "UL LIPA Tunnel Endpoint" (603) and "DL LIPA Tunnel Endpoint" (604) shares the same format as that of 509 and 510. The "QoS Parameters" (605) shares the format as that of 502.

The "Security Associations" (606) contains the keying material for the HeNB-1 (121) to derive keys for protecting the forwarding tunnels.

With reference to FIG. 7, and example format of the "E-RABs Switched in Downlink Item IEs" of the Path Switch Request (3003) is illustrated.

The "E-RAB ID" (701), "Transport Layer Address" (702), "GTP-TEID" (703) take the same format as those defined in (Non Patent Literature 7).

The "LIPA Flag" (704), "DL LIPA Tunnel Endpoints" (705), "UL LIPA Tunnel Endpoints" (706), and "Security Associations" (707) follow the same format as those of 602, 603, 604, and 606 respectively.

"DL LIPA Tunnel Endpoints" (705) is the downlink tunnel end points that are used by the HeNB-2 (131) for receiving downlink LIPA traffic. It may be of the same value as that of 604. The LIPA-GW (141) should be sending LIPA downlink traffic to this address when the path switch is successful.

The "UL LIPA Tunnel Endpoints" (706) is the uplink tunnel end points information used by the HeNB-2 (131) for sending LIPA uplink traffic to the LIPA-GW directly (141). This may be needed by the LIPA-GW (141) for security check reasons.

(Embodiment 3)

Figure 8:
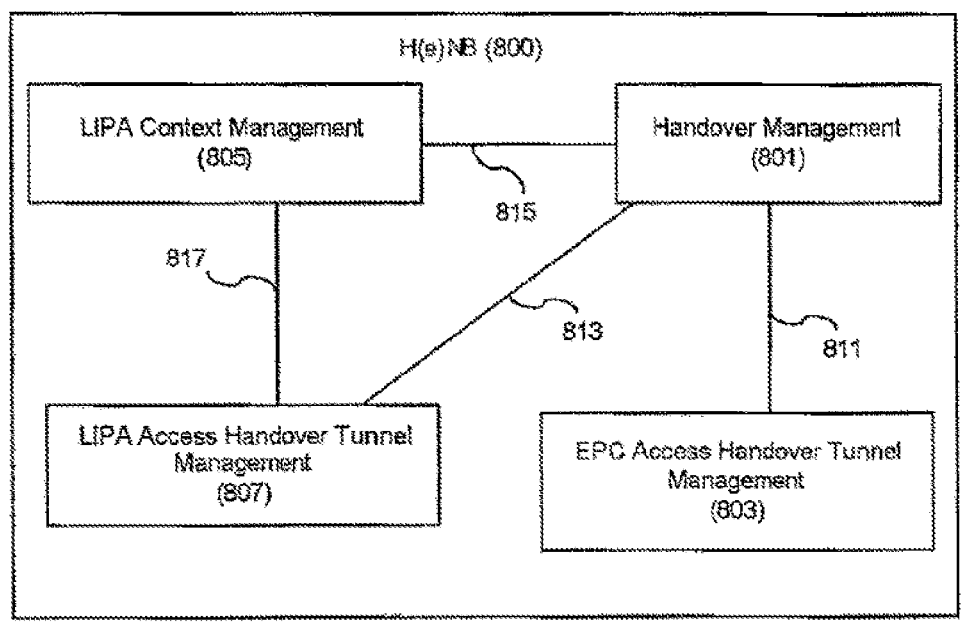
FIG. 8 is an example function architecture of the H(e)NB that supports the present invention.

With reference to FIG. 8, an example architecture for the H(e)NB (800) used in the present invention is illustrated.

The H(e)NB (800) has four major function blocks, i.e. Handover Management (801), EPC Access Handover Tunnel Management (803), LIPA Context Management (805), and the LIPA Access Handover Tunnel Management (807).

The Handover Management (801) is in charge of the handover operation, e.g. sending and receiving the handover related messages like Handover Request (2009), Handover Request Acknowledge (2013), Path Switch Request (3003), and Path Switch Request Ack (3017).

The EPC Access Handover Tunnel Management (803) is in charge of setup the handover tunnel between the HeNB-1 (121) and HeNB-2 (131) during the handover process for forwarding the downlink EPC traffic. It may need to create a direct tunnel using their local address, i.e. IP_LH1 and IP_LH2, instead of IP_CH1 and IP_CH2. Security association setup will be also involved in the due process.

The LIPA Context Management (LCM) (805) is in charge of handling the creation and removing of the LIPA Connection context illustrated in FIG. 4. For example, when the UE successfully handovered to HeNB-2 (131), the LCM (805) will remove the LIPA Connection context in HeNB-1 (121). And, when the HeNB-2 (131) receives the Handover Request (2009), the LCM (805) will create corresponding LIPA Connect Context in HeNB-2 (131). When the Path Switch Request Ack (30171 is received, the LCM (805) on HeNB-2 (131) would update the LIPA Connection context accordingly.

The LIPA Access Handover Tunnel Management (LAHTM) (807) is in charge of setup the handover tunnel between the HeNB-1 (121) and HeNB-2 (131) during the handover process for forwarding the downlink and uplink LIPA traffic. In the process, local address of the HeNB-1 (121) and HeNB-2 (131) will be used, i.e. IP_LH1 and IP_LH2. After receiving the Path Switch Request Ack (3017), the LAHTM (807) is also in charge of creating a direct tunnel towards the LIPA-GW (141) for forwarding uplink LIPA traffic. In this case, the local address of LIPA-GW (141), i.e. IP_LG1, is used. Security association establishment is also involved in the process. Therefore, security functions like IKEv2, IPSec shall be supported by LAHTM (807), and these functions can also be shared with EPC Access Handover Tunnel Management (803).

(Embodiment 4)

Figure 9:
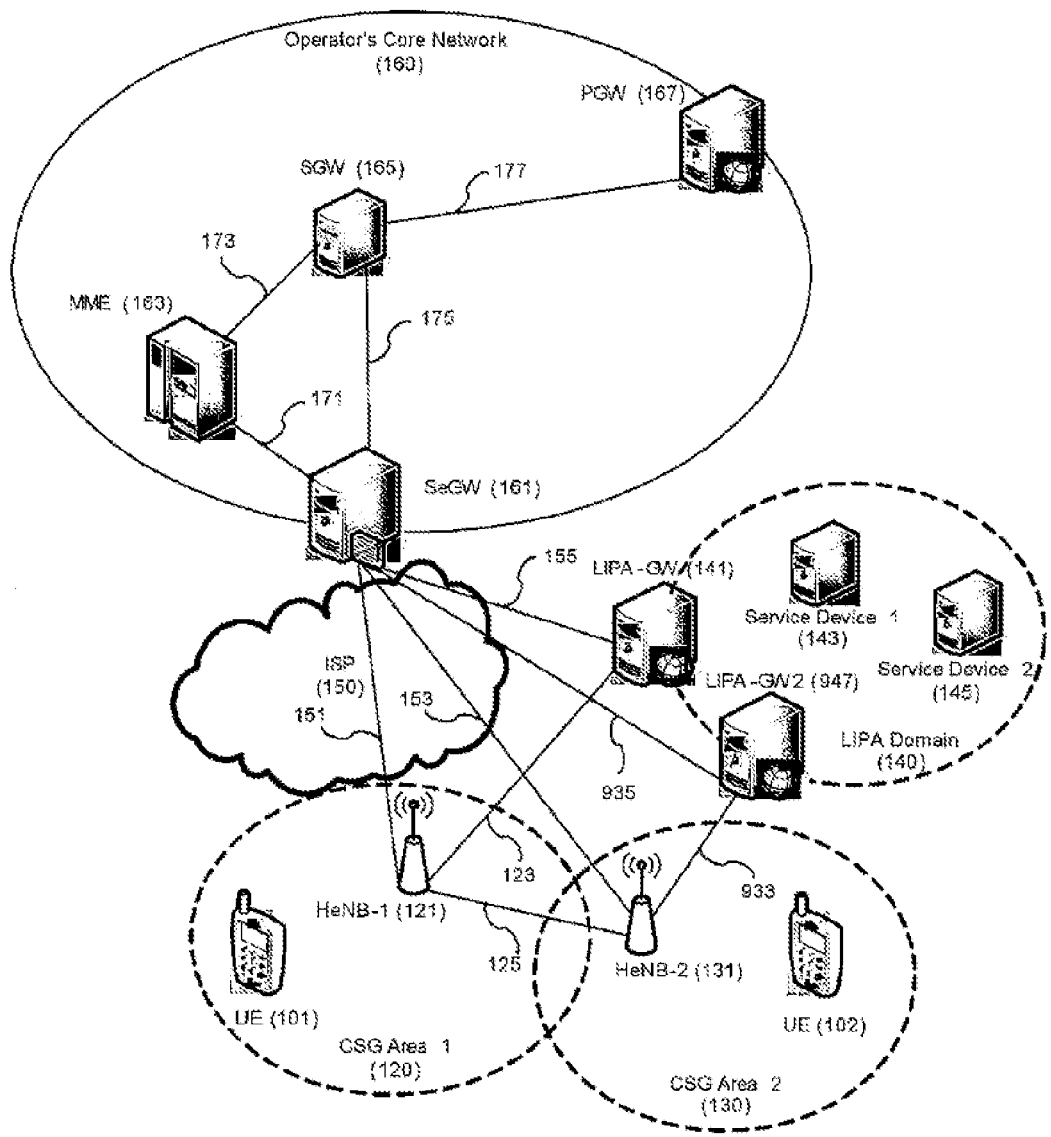
FIG. 9 is an alternative system architecture that supports the present invention.

With reference to FIG. 9, an alternative system architecture that supports the current invention is illustrated. The architecture is similar to that illustrated FIG. 1, but each of the HeNBs may be associated with a different LIPA-GW. For example, HeNB-1 (121) may be allowed to access LIPA Domain (140) via LIPA-GW (141), and HeNB-2 (131) may be allowed to access LIPA Domain (140) via LIPA-GW2 (947). In real deployment, this could be caused by the access restriction, VLAN deployment, physical limitation, or load balancing considerations.

In this case, when UE (101) moves to location (102), it needs to relocate the PDN GW function, as LIPA-GW is similar to the PDN GW function as defined in (Non Patent Literature 2). However, normally, when the PDN GW function is relocated, service interruption will be caused.

For example, if the LIPA-GW (141) and LIPA-GW2 (947) belong to different address space, UE (102) would need to make use of a new IP address. Even if the LIPA-GW (141) and LIPA-GW2 (947) belong to the same address space and allow the UE (102) to keep the same IP address when it changes the serving LIPA-GW, other devices in the LIPA Domain (140) may be confused. For example, Service Device 1 (143) may keep an ARP entry that actually points to LIPA-GW (141) even thought UE (102) has moved to use LIPA-GW2 (947). This is especially harmful for application on UE (102) that is expecting incoming data.

In order to solve the issue, operation sequence introduced above for this invention can be utilized. One potential approach is that when the HeNB-2 (131) receives the Handover Request (2009), it will realize that a different LIPA-GW2 (947) would be serving the UE at the new location, e.g. such as a new cell, a new tracking area, etc. In this case, HeNB-2 (131) will indicate such issue in the Handover Request Response (2013) using the "LIPA Flag" (602). In this case, the HeNB-1 (121) will keep the bi-direction tunnel for an extended time or permanently. This way, traffic will always be forwarded via HeNB-1 (121).

HeNB-2 (131) will place a flag in the LIPA connection context, and stores the necessary information regarding HeNB-1. Therefore, when next time, UE (102) moves to another new location, HeNB-1 (121)'s local address information will be passed to the new HeNB (not shown in the figure) in the Handover Request message. The new HeNB will then establish tunnel with the HeNB-1 (121), and UE's LIPA traffic will still be forwarded via HeNB-1 (121).

Note that this forwarding is only for LIPA traffic. EPC traffic will still handovered using normal procedure as described in FIGS. 2 and 3.

Another alternative is for the MME (163) to manage it. HeNB-1 (121) and HeNB-2 (131) just follow the procedure as described in FIGS. 2 and 3. When the HeNB-2 (131) sends the Path Switch Request (3003), the MME (163) would detect that a new LIPA-GW2 (947) should be allocated for HeNB-2 (131). In this case, MME (163) sends a Create Bearer Request towards LIPA-GW2 (947), with the "E-RABs Switched in Downlink Item IEs".

In this case, a new direct connection between HeNB-2 (131) and LIPA-GW2 (947) are established. However, this new direct connection is only for uplink LIPA traffic. The downlink LIPA traffic is still tunneled via LIPA-GW (141) and HeNB-1 (121). This tunnel will only be removed when the HeNB-2 (131) decides to send the Release Resources (3019) to HeNB-1 (121), for example, no traffic observed over the forwarding link for an extended period, or the original LIPA bearers were removed.

Yet another approach is similar to the above process. When received the Path Switch Request (3003), the MME (163) sends a Create Bearer Request (or Create Session Request) towards the LIPA-GW2 (947) via SGW (165) with the "LIPA Flag" indicating change of LIPA-GW address. The LIPA-GW2 (947) will include an additional downlink tunnel endpoints element in the "E-RABs Switched in uplink Item IEs".

When the MME (163) receives the Create Bearer Response (or Create Session Response) from the SGW (165), it extracts the new downlink tunnel endpoints element from "E-RABs Switched in uplink Item IEs", and sends a Modify Bearer Request towards LIPA-GW (141). This will trigger the LIPA-GW (141) to establish a connection with LIPA-GW2 (947) for forwarding the downlink LIPA traffic of UE (102) to LIPA-GW2 (947). This way, service continuity can be guaranteed.

(Embodiment 5)

In the above descriptions, it is assumed that the LIPA-GW (141) is standalone. In actual deployment, the LIPA-GW (141) may be collocated with one of the H(e)NB, for example the master H(e)NB. In that case, this master H(e)NB just carry out the function that is described in the process. It is obvious to anyone skilled in the art that the present invention can be still applied.

If there are multiple master H(e)NBs in the local network, e.g. as in FIG. 9, the LIPA-GW (141) is collocated with HeNB-1 (121) and LIPA-GW2 (947) is collocated with HeNB-2 (131), the present invention is still applicable, e.g. by using the enhanced procedures in Embodiment 4.

It is obvious to anyone skilled in the art that one UE may initiate multiple LIPA or SIPTO Connections. In that case, the procedure of the present invention should be applied on each individual connection. Certain optimization could be achieved by combining the signaling messages if these connections are using the same LIPA-GW (141). However, this does not affect the general principle of the invention.

In the above description, the procedure of X2 handover is used. However, it is obvious to anyone skilled in the art that the general principle can be also applied to S1 based handover defined in (Non Patent Literature 2) with minor modifications.

For example, when S1 based handover is used, a Handover Required message will be sent by HeNB-1 (121) to the MME (163), and a Handover Request will be set from MME (163) to HeNB-2 (131), according to the "target eNodeB Identity" specified by HeNB-1 (121). In this case, the "E-RABs To Be Setup Item" as described in FIG. 5 will be included in the "Source to Target transparent container" of the Handover Required message, and will be forwarded by MME (163) in the Handover Request message towards HeNB-2 (131). The "Direct Forwarding Path Availability" may be set to available if HeNB-2 (131)'s ECGI or CSG ID is in the "Allowed ECGI List" or "Allowed CSG ID List" of the LIPA Connection Context stored in HeNB-1 (121). Also, in this case, the "UL GTP Tunnel Endpoint" (504) should provide the LIPA-GW (141)'s uplink tunnel end point information stored in HeNB-1 (121), in a format similar to that of "UL LIPA Tunnel Endpoints" (706). The "Security Associations" (511) should also provide security keying information for HeNB-2 (131) to rekey with the LIPA-GW (141).

Similarly, in the S1 based handover, the Handover Request Acknowledge message from HeNB-2 (131) will contain the "E-RABs Admitted Item", as described in FIG. 6, in the "Target to Source transparent container". MME (163) will include the "Target to Source transparent container", containing the "E-RABs Admitted Item", into the Handover Command message towards the HeNB-1 (121).

The HeNB-2 (131) can also include the "E-RABs Switched in Downlink Item IEs" element as described in FIG. 7 in the Handover Request Acknowledge message. This element's information will be stored in MME (163). Once the Handover Notify message is received from HeNB-2 (131), the MME (163) include information from the "E-RABs Switched in Downlink Item IEs" element in the Modify Bearer Request message towards the LIPA-GW (141), similar to step 3005 and 3009.

Alternatively, the HeNB-2 (131) can include the "E-RABs Switched in Downlink Item IEs" in the Handover Notify message, and MME (163) will forward it in the Modify Bearer Request message towards LIPA-GW (141).

In the "Security Associations" (707) of the "E-RABs Switched in Downlink Item IEs" element, HeNB-2 (131) will include the rekey information that is derived from the "Security Associations" (511) from HeNB-1 (121).

Once the Modify Bearer Request containing the "E-RABs Switched in Downlink Item IEs" is received at LIPA-GW (141), the LIPA-GW (141) will make use of the information to establish the direct connection towards the HeNB-2 (131). The rekey information in the "Security Associations" (707) will be used to derive keys for protecting the direct connection.

The LIPA-GW (141) will start to forward downlink LIPA traffic for UE (102) to HeNB-2 (131) using the direct tunnel once the direct connection is ready. Upon receiving the downlink LIPA traffic from the LIPA-GW (141) via the direct connection, HeNB-2 (131) will switch the path and send the uplink LIPA traffic from UE towards the LIPA-GW (141), using the information indicated in "UL GTP Tunnel Endpoint" (504) of the Handover Request message. If there is no user plane data for UE (102) for a long time, the LIPA-GW (141) can forge a packet to the UE (102), e.g. a ICMP ping message, to activate the HeNB-2 (131) for the uplink direct connection.

(Embodiment 6)

In an alternative operation for the architecture presented in FIG. 9, the source HeNB, e.g. HeNB-1 (121), can help to optimize the address handling. In this operation, when the source HeNB, e.g. HeNB-1 (121), decides that the UE (101) needs to handover to another cell that is not covered by the current LIPA-GW (141), e.g. HeNB-2 (131), the source HeNB will initiate a teardown of the LIPA bearer towards the MME (163). In this teardown message, e.g. E-RAB Release Indication, the source HeNB indicates the Cause as "LIPA Handover".

When received this E-RAB Release Indication, the MME (163) does not immediately trigger the tear down of the LIPA bearers. Instead, it marks the LIPA bearer with the "LIPA Handover" flag.

The HeNB-1 (121) follows the handover operation as described in Embodiment 1, i.e. by setting up the bi-directional tunnel with the target HeNB-2 (131) and starts forwarding. In the handover signaling, the HeNB-1 (121) provides all the bearers to the HeNB-2 (131), including the LIPA bearers it indicated as release to the MME (163) earlier.

After the UE (102) established the radio connection to the target HeNB, e.g. HeNB-2(131), a Path Switch message will be forwarded to the MME (163). Once the MME (163) sees this message, it will update all the bearers accordingly. For the LIPA bearers that has been marked with "LIPA Handover" flag, the MME (163) issues a Delete Session Request towards the LIPA-GW (141). The LIPA-GW (141) removes the corresponding LIPA bearers and responds to the MME (163) with Delete Session Response on which message it provides IP address(es)/prefix(es) allocated to the UE (101) for the LIPA connections. When received this response, MME (163) issues a new Create Session Request towards the newly identified LIPA-GW2 (947) associated with the new HeNB, e.g. HeNB-2 (131). In the Create Session Request, the MME indicates the IP address(es)/prefix(es) that should be used by the UE (102) for IP address preservation and session continuity.

Based on the indicated information from MME (163), the LIPA-GW2 (947) can perform different operations:
- If the IP address(es)/prefix(es) to be assigned to the UE (102) belongs to the domain of LIPA-GW2 (947), e.g. it can directly act as a router for the IP address(es)/prefix(es), the LIPA-GW2 (947) would try to obtain the ownership of the IP address(es)/prefix(es), e.g. by sending ARP messages, IPv6 Router Advertisement message or Neighbor Advertisement message, and defend the IP address(se)/prefix(es);
- if the IP address(es)/prefix(es) to be assigned to the UE (102) cannot be owned directly by the LIPA-GW2(947), e.g. it belongs to a subnet of the LIPA-GW(141), the LIPA-GW2(947) would try to establish a tunnel towards the LIPA-GW(141) for the forwarding of the packets. If security, authentication, authorization, encryption, etc., are required for the tunnel, necessary information, e.g. keying materials, etc., can be attached to or contained in the messages to convey the IP address(es)/prefix(es) information, i.e. such as Delete Session Response with which LIPA-GW 141) sends the necessary information to the MME (163) and Create Session Request with which the MME(163) forwards the necessary information to the LIPA-GW2(947). Thus, the necessary information is transferred from LIPA-GW(141) to LIPA-GW2 (947) to establish the tunnel between them. Furthermore, LIPA-GW2(947) may send response to the transferred message from LIPA-GW (141) via MME (163) to exchange the keying materials, e.g. via challenge-response handshake, to ensure security requirements. The acquisition of the necessary information from LIPA-GW (141) or exchange of the keying materials between LIPA-GW (141) and LIPA-GW2(947) may be initiated by the LIPA-GW2(947).

When establishing the tunnel between LIPA-GW (141) and LIPA-GW2(947), LIPA-GW (141) or LIPA-GW2(947) may allocate QoS resources such as bandwidth, delay, priority of packet handling to the tunnel. The QoS allocation to the tunnel will be based on and aligned with the QoS allocated to the LIPA bearer which was target of the handover to via HeNB2.

When LIPA-GW2(947) is not allowed to establish tunnel to LIPA-GW(141), e.g. due to security reason, for example, that security level of connection between HeNB2 and LIPA-GW2(947) is not sufficient for the traffic via LIPA-GW (141) to go through to the PDN, or the security level is less than one of the connection between HeNB1 and LIPA-GW(141), the LIPA-GW2(947) may upgrade the security level of the connection with HeNB2, otherwise the LIPA-GW2(947) may not initiate the tunnel establishment with LIPA-GW(141).

Once the HeNB-2 (131) obtained the direct path with LIPA-GW2 (947), it can sever the connection with the HeNB-1 (121). At the same time, the LIPA-GW (141) can disconnect from the HeNB-1 (121) after it transfers the IP address(es)/prefix(es) ownership, e.g. sees the ARP, RA/NA message from LIPA-GW2(947), or a direct tunnel is established with the LIPA-GW2(947) for forwarding.

In another alternative operation, when the LIPA-GWs are collocated with the HeNBs, e.g. LIPA-GW (141) is collocated with HeNB-1 (121), and LIPA-GW2 (947) is collocated with HeNB-2 (131), the signaling of the IP address(es)/prefix (es) can be performed as part of the X2 handover signaling between HeNBs. In that case, there is no need for the MME to include any special information in the signaling messages towards the LIPA-GWs.

In another alternative architecture, the LIPA-GWs, e.g. LIPA-GW (141), may sits on the path between the HeNBs and the SeGW (161), e.g. when the LIPA-GW (141) is the enterprise router where the HeNBs are deployed. In this case, HeNBs would still need to establish secure connections with SeGW (161), which is transparent to the LIPA-GW (141). Therefore, the present invention still applies. It is obvious to anyone skilled in the art that these different deployment and operation options do not affect the general principle of the present invention.

In the previous embodiments, it is assumed that the SGW for the LIPA connection is in the operator's core network (160). However, it is obvious to anyone skilled in the art that the present invention can also apply to cases that a SGW collocated with the LIPA-GW (141) or LIPA-GW2 (947).

Each functional block used in the description of the embodiments as given above can be realized as LSI, typically represented by the integrated circuit. These may be produced as one chip individually or may be designed as one chip to include a part or all. Here, it is referred as LSI, while it may be called IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

INDUSTRIAL APPLICABILITY

The invention has the advantage of reaching LGW (LIPA-GW) without going via operator's core network before establishment of shortcut path between the target HeNB (HeNB-2) and LGW. Therefore, the invention can be advantageously used as the management for the local IP access in a mobile communication system.

The invention claimed is:

1. A handover method for a user equipment (UE) attaching to a local internet protocol (IP) network, wherein the UE handovers from a source home base station to a target home base station connected to the local IP network, the handover method comprising:
   a deciding step where the source home base station decides that a direct forwarding path between the target home base station and the source home base station is required;

a requesting step where the source home base station requests the target home base station to create the direct forwarding path;

a creating step where the target home base station creates the direct forwarding path according to the request from the source home base station;

a downlink forwarding step where the source home base station forwards downlink packets destined for the UE to the target home base station via the direct forwarding path;

an uplink forwarding step where the target home base station forwards uplink packets from the UE to the source home base station via the direct forwarding path until a direct connection between the target home base station and a local gateway is established; and a transferring step where the source home base station further forwards the uplink packets forwarded from the target home base station to the local gateway via an existing direct connection between the source home base station and the local gateway.

2. The handover method according to claim 1, wherein the source home base station decides that the direct forwarding path is required when detecting that a cell of the target home base station is connected to the local IP network.

3. The handover method according to claim 1, wherein the source home base station decides that the direct forwarding path is required when detecting that the target home base station provides the same local IP access service as the source home base station provides.

4. The handover method according to claim 1, the handover method further comprising;

an establishing step where the target home base station starts to create the direct connection to the local gateway after the creating step is completed.

5. The handover method according to claim 4, the handover method further comprising;

a switching step where the target home base station switches a path for the uplink packets from the direct forwarding path to the source home base station to the direct connection to the local gateway when the direct connection is established.

6. The handover method according to claim 1, the handover method further comprising:

a direct tunnel establishing step where the local gateway establishes a direct tunnel between the local gateway and a target local gateway when the target home base station is served by the target local gateway; and a forwarding step where the target local gateway forwards downlink packets destined for the UE to the target base station via the direct tunnel and the direct forwarding path.

7. The handover method according to claim 4, the establishing step further establishes a security association and applies the security association to the direct connection when the target home base station is indicated that the security association is required for the direct connection.

8. A handover system for a user equipment (UE) attaching to a local internet protocol (IP) network, wherein the UE handovers from a source home base station to a target home base station connected to the local IP network, the handover system includes the source home base station and the target home base station;

the source home base station decides that a direct forwarding path between the target home base station and the source home base station is required;

the source home base station requests the target home base station to create the direct forwarding path;

the target home base station creates the direct forwarding path according to the request from the source home base station;

the source home base station forwards downlink packets destined for the UE to the target home base station via the direct forwarding path;

the target home base station forwards uplink packets from the UE to the source home base station via the direct forwarding path until a direct connection between the target home base station and a local gateway is established; and the source home base station further forwards the uplink packets forwarded from the target home base station to the local gateway via an existing direct connection between the source home base station and the local gateway.

9. The handover system according to claim 8, wherein the source home base station decides that the direct forwarding path is required when detecting that a cell of the target home base station is connected to the local IP network.

10. The handover system according to claim 8, wherein the source home base station decides that the direct forwarding path is required when detecting that the target home base station provides the same local IP access service as the source home base station provides.

11. The handover system according to claim 8, wherein the target home base station starts to create the direct connection to local gateway after the direct forwarding path is created.

12. The handover system according to claim 11, wherein the target home base station switches a path for the uplink packets from the direct forwarding path to source home base station to the direct connection to the local gateway when the direct connection is established.

13. Apparatus for home base station included in a handover system for a user equipment (UE) attaching to a local internet protocol (IP) network, wherein the UE handovers from the home base station as a source home base station to a target home base station connected to the local IP network, the apparatus for home base station comprising:

a decision unit that decides a direct forwarding path between the target home base station and the home base station is required;

a request unit that requests the target home base station to create the direct forwarding path;

a forwarding unit that forwards downlink packets destined for the UE to the target home base station via the direct forwarding path created by the target home base station according to the request from the home base station; and a transmission unit that forwards uplink packets forwarded from the target home base station to a local gateway via an existing direct connection between the home base station and the local gateway.

14. The apparatus for home base station according to claim 13, wherein the decision unit decides that the direct forwarding path is required when detecting that a cell of the target home base station is connected to the local IP network.

15. The apparatus for home base station according to claim 13, wherein the decision unit decides that the direct forwarding path is required when detecting that the target home base station provides the same local IP access service as the home base station provides.

16. Apparatus for home base station included in a handover system for a user equipment (UE) attaching to a local internet protocol (IP) network, wherein the UE handovers from a source home base station to the home base station as a target home base station within the local IP network, the apparatus for home base station comprising:

a creation unit for creating a direct forwarding path between the home base station and the source home base station according to a request from the source home base station; and a transmission unit for forwarding uplink packets from the UE to the source home base station via the direct forwarding path until a direct connection between the home base station and a local gateway is established.

17. The apparatus for home base station according to claim 16, the creation unit starts to create the direct connection to the local gateway after the direct forwarding path is created.

18. The apparatus for home base station according to claim 17, the apparatus for home base station further comprising;
a switch unit that switches a path for the uplink packets from the direct forwarding path to the source home base station to the direct connection to the local gateway when the direct connection is established.

* * * * *